United States Patent
Giffen et al.

(10) Patent No.: US 11,192,494 B2
(45) Date of Patent: Dec. 7, 2021

(54) SYSTEMS AND METHODS FOR SEARCH AND LANDING LIGHT

(71) Applicant: HONEYWELL INTERNATIONAL INC., Morris Plains, NJ (US)

(72) Inventors: Craig Giffen, Urbana, OH (US); Gerald Blair, Urbana, OH (US); Timothy Martin, Urbana, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/784,412

(22) Filed: Feb. 7, 2020

(65) Prior Publication Data

US 2021/0245655 A1  Aug. 12, 2021

(51) Int. Cl.
*B60Q 1/24* (2006.01)
*F21S 41/657* (2018.01)
*B64D 47/02* (2006.01)
*F21W 107/30* (2018.01)

(52) U.S. Cl.
CPC ............. *B60Q 1/245* (2013.01); *B64D 47/02* (2013.01); *F21S 41/657* (2018.01); *F21W 2107/30* (2018.01)

(58) Field of Classification Search
CPC ....... B60Q 1/245; B64D 47/02; F21S 41/657; F21W 2107/30
See application file for complete search history.

(56) References Cited

U.S. PATENT DOCUMENTS

| | | | |
|---|---|---|---|
| 1,817,907 A | 4/1926 | Bassett et al. | |
| 4,729,071 A | 3/1988 | Solomon | |
| 5,027,260 A * | 6/1991 | Lyons | B60Q 1/2611 |
| | | | 362/240 |
| 5,490,046 A * | 2/1996 | Gohl | B60Q 1/076 |
| | | | 362/233 |
| 5,589,901 A | 12/1996 | Means | |
| 6,061,522 A | 5/2000 | Inoue et al. | |
| 6,191,547 B1 | 2/2001 | Fricke et al. | |

(Continued)

FOREIGN PATENT DOCUMENTS

| | | |
|---|---|---|
| CN | 207621820 U | 7/2018 |
| EP | 2719580 B1 | 11/2020 |

(Continued)

OTHER PUBLICATIONS

The SA Group, "Thommen Helicopter Searchlight", HSL-1600/HSL 800.

(Continued)

*Primary Examiner* — William N Harris
(74) *Attorney, Agent, or Firm* — Lorenz & Kopf, LLP

(57) ABSTRACT

A search and landing light for a vehicle includes a light emitting element having an output primarily along a first axis and a canopy surrounding the light emitting element. The search and landing light includes a housing to enclose one or more electrical components associated with the search and landing light. The housing and the canopy extend along a longitudinal axis that is substantially perpendicular to the first axis. The search and landing light includes an actuator coupled between the canopy and disposed in the housing. The actuator is disposed along the longitudinal axis and is configured to rotate the canopy relative to the housing.

16 Claims, 7 Drawing Sheets

(56) References Cited

U.S. PATENT DOCUMENTS

| | | | |
|---|---|---|---|
| 6,315,435 B1 * | 11/2001 | Hamilton | B60Q 1/245 |
| | | | 362/464 |
| 6,604,843 B2 | 8/2003 | Shpizel | |
| 6,609,812 B2 | 8/2003 | Machi et al. | |
| 6,642,666 B1 | 11/2003 | St-Germain | |
| 6,783,260 B2 | 8/2004 | Machi et al. | |
| 6,786,622 B1 | 9/2004 | Rice | |
| 6,796,690 B2 | 9/2004 | Bohlander | |
| 6,909,250 B2 | 6/2005 | Jigamian et al. | |
| 6,962,423 B2 | 11/2005 | Hamilton et al. | |
| 7,080,928 B2 | 7/2006 | Barnhart et al. | |
| 7,147,353 B2 | 12/2006 | Lin | |
| 7,175,316 B2 | 2/2007 | Shpizel | |
| 7,296,917 B1 | 11/2007 | Chiu | |
| 7,334,915 B2 | 2/2008 | Kim | |
| 7,452,091 B2 | 11/2008 | LeBlanc et al. | |
| 7,494,247 B2 | 2/2009 | Wen | |
| 7,518,133 B2 | 4/2009 | Giffen et al. | |
| 7,672,760 B2 | 3/2010 | Solberg et al. | |
| 7,675,248 B2 | 3/2010 | Mubaslat et al. | |
| 7,810,971 B2 | 10/2010 | Robinson | |
| 7,859,182 B2 | 12/2010 | Radkov et al. | |
| 7,862,197 B2 | 1/2011 | Gebhard | |
| 7,862,208 B2 | 1/2011 | Melzner | |
| 7,906,790 B2 | 3/2011 | Radkov et al. | |
| 8,147,081 B2 | 4/2012 | Mrakovich et al. | |
| 8,297,806 B2 | 10/2012 | Hinckley et al. | |
| 8,436,747 B2 | 5/2013 | Schoepp | |
| 8,449,136 B2 | 5/2013 | Kennedy et al. | |
| 8,480,257 B2 | 7/2013 | Shang et al. | |
| 8,488,841 B2 | 7/2013 | Lee et al. | |
| 8,552,842 B2 | 10/2013 | Lee et al. | |
| 8,553,100 B2 | 10/2013 | LeBlanc et al. | |
| 8,590,441 B1 | 11/2013 | Good | |
| 8,636,384 B2 | 1/2014 | Armstrong | |
| 8,708,535 B2 * | 4/2014 | Dalsgaard | F21V 21/30 |
| | | | 362/418 |
| 8,786,207 B2 | 7/2014 | Huang et al. | |
| 8,836,541 B2 | 9/2014 | Fidanza | |
| 8,960,963 B1 | 2/2015 | Campbell et al. | |
| 8,996,203 B2 | 3/2015 | Campbell et al. | |
| 9,127,815 B2 | 9/2015 | Tachino et al. | |
| 9,188,292 B2 | 11/2015 | Armer et al. | |
| 9,234,639 B2 | 1/2016 | Shpizel | |
| 9,253,851 B2 | 2/2016 | Hoffer, Jr. et al. | |
| 9,269,697 B2 | 2/2016 | Wu et al. | |
| 9,377,862 B2 | 6/2016 | Parkinson et al. | |
| 9,411,047 B2 | 8/2016 | Kokubo et al. | |
| 9,423,092 B1 | 8/2016 | Deyaf et al. | |
| 9,622,311 B1 | 4/2017 | Fries et al. | |
| 9,635,739 B1 | 4/2017 | Schoen et al. | |
| 9,643,736 B1 | 5/2017 | Ell | |
| 9,751,637 B2 | 9/2017 | Schoen et al. | |
| 9,863,622 B1 | 1/2018 | Armer et al. | |
| 9,884,691 B2 | 2/2018 | Jha et al. | |
| 9,890,923 B2 | 2/2018 | Wang | |
| 9,944,405 B2 | 4/2018 | Mouton et al. | |
| 10,012,369 B1 * | 7/2018 | Wang | F21V 21/15 |
| 10,053,231 B2 | 8/2018 | Lapujade | |
| 10,056,530 B1 | 8/2018 | Melman et al. | |
| 10,086,751 B2 | 10/2018 | Salter et al. | |
| 10,150,574 B2 | 12/2018 | Nogales et al. | |
| 10,180,246 B2 | 1/2019 | Giffen | |
| 10,189,579 B2 | 1/2019 | Hessling-Von Heimendahl | |
| 10,266,281 B2 | 4/2019 | Hessling-Von Heimendahl et al. | |
| 10,308,330 B1 | 6/2019 | Spivak | |
| 10,415,796 B2 | 9/2019 | Friedland | |
| 10,527,236 B2 | 1/2020 | Daniels | |
| 10,670,249 B1 | 6/2020 | Brahmbhatt et al. | |
| 10,723,482 B1 | 7/2020 | Salesse-Lavergne | |
| 10,920,951 B2 | 2/2021 | Hausmann et al. | |
| 2010/0259945 A1 * | 10/2010 | Chiu | F21V 21/30 |
| | | | 362/428 |
| 2014/0204218 A1 * | 7/2014 | Gebhard | B60R 11/04 |
| | | | 348/164 |
| 2015/0036365 A1 * | 2/2015 | Schoen | B60Q 1/245 |
| | | | 362/470 |
| 2018/0016030 A1 | 1/2018 | Hessling-Von Heimendahl | |
| 2018/0156420 A1 | 6/2018 | Dudik et al. | |
| 2018/0209602 A1 | 7/2018 | Kerscher | |
| 2018/0226545 A1 | 8/2018 | He et al. | |
| 2019/0032879 A1 | 1/2019 | Tsao | |
| 2019/0068863 A1 | 2/2019 | Boer | |
| 2020/0172264 A1 | 6/2020 | Das et al. | |
| 2020/0198525 A1 | 6/2020 | Mueller et al. | |
| 2020/0240602 A1 | 7/2020 | Huang | |
| 2020/0247556 A1 | 8/2020 | Shamasundar | |
| 2020/0309537 A1 | 10/2020 | Kulkarni et al. | |
| 2020/0324912 A1 | 10/2020 | De Brouwer | |

FOREIGN PATENT DOCUMENTS

| | | |
|---|---|---|
| GB | 663988 | 1/1952 |
| RU | 2235046 C2 | 8/2004 |
| WO | 2019184277 A1 | 10/2019 |

OTHER PUBLICATIONS

Oxley, "Dual Mode High Intensity LED Landing Light", pp. 1-2, OX44374, UK.

Leonardo "LED IR-Visible Landing & Search Light", 2019, MM0823 08-19, Italy.

LFD Limited "Dual Mode Search Light", 2006, UK.

Cobham, "Dual-mode Search and Landing Light", 2020, France, https://www.cobhamaerospacecommunications.com/aircraft-lights/external-aircraftlighting/dualmode-search-and-landing-light/.

Spectrolab, "Illumination", 2021, US, https://www.spectrolab.com/illumination.html.

Collins Aerospace, "Landing Light", 2021, US, https://www.aeroexpo.online/prod/collins-aerospace-rockwell-collins/product-170410-48260.html.

* cited by examiner

SYSTEMS AND METHODS FOR SEARCH AND LANDING LIGHT

TECHNICAL FIELD

The present disclosure generally relates to lighting systems for a mobile platform, and more particularly relates to systems and methods for a search and landing light for use with a mobile platform.

BACKGROUND

Generally, mobile platforms, such as rotorcraft, employ various lighting systems to illuminate areas outside of the rotorcraft for landing, inspecting, etc. Typically, lighting systems for mobile platforms are subject to size constraints, which result in limited functionality in the lighting system. In addition, in order to rotate the light beam output by the lighting system relative to the mobile platform, due to the size constraints, an additional pivot axis is added to the lighting system. The additional pivot axis added to enable the lighting system to rotate relative to the mobile platform results in the light beam rotating in an unusual pattern, which requires the operator of the mobile platform to reposition the lighting system during the rotation to correct the pattern of the light beam. This increases the workload of the operator, which is undesirable.

Accordingly, it is desirable to provide systems and methods for a search and landing light for a mobile platform that meets size constraints, and in which the light beam output by the lighting system moves in a normal, expected pattern relative to the mobile platform when rotated to reduce operator workload. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a search and landing light for a vehicle. The search and landing light includes a light emitting element having an output primarily along a first axis and a canopy surrounding the light emitting element. The search and landing light includes a housing to enclose one or more electrical components associated with the search and landing light. The housing and the canopy extend along a longitudinal axis that is substantially perpendicular to the first axis. The search and landing light includes an actuator coupled between the canopy and disposed in the housing. The actuator is disposed along the longitudinal axis and is configured to rotate the canopy relative to the housing.

The search and landing light includes a first actuator coupled between the canopy and the housing. The first actuator includes a first output shaft that defines a second axis of rotation that is transverse to the longitudinal axis and the first actuator is configured to pivot the canopy relative to the housing. The actuator includes an output shaft, which defines a first axis of rotation, and the first axis of rotation is transverse to the second axis of rotation defined by the first actuator. The housing comprises a first housing and a second housing. The first actuator is positioned proximate to the first housing, and the actuator is disposed within the second housing. The second housing is coupled between the first housing and the canopy along the longitudinal axis to enclose the one or more electrical components. The actuator includes an output shaft, and the one or more electrical components comprise at least one slip ring coupled to the output shaft and positioned within the housing between the actuator and the canopy. The actuator includes an output shaft, and the one or more electrical components comprise a brake coupled to the output shaft and positioned within the housing proximate the actuator. The actuator includes an output shaft, and the search and landing light includes a gearbox coupled between the output shaft and the canopy. The gearbox is a planetary gearbox and the output shaft is a sun gear. The search and landing light includes a light controller, which is responsive to one or more control signals received from a human-machine interface to rotate the canopy relative to the housing.

Further provided is a search and landing light for a vehicle. The search and landing light includes a light emitting element having an output primarily along a first axis, and a canopy surrounding and coupled to the light emitting element. The search and landing light includes a housing to enclose one or more electrical components associated with the search and landing light. The housing and the canopy extend along a longitudinal axis that is substantially perpendicular to the first axis. The search and landing light includes a first actuator coupled proximate the housing that is configured to pivot the canopy relative to the housing, and a second actuator coupled between the canopy and disposed within the housing. The second actuator is disposed along the longitudinal axis and is configured to rotate the canopy relative to the housing. The second actuator defines an axis of rotation, and the first actuator defines a second axis of rotation, and the axis of rotation is transverse to the second axis of rotation.

The housing comprises a first housing and a second housing. The first actuator is positioned proximate to the first housing, and the second actuator is disposed within the second housing. The second housing is coupled between the first housing and the canopy to enclose the one or more electrical components. The second actuator includes an output shaft, and the one or more electrical components comprise at least one slip ring coupled to the output shaft and positioned within the second housing between the second actuator and the canopy. The actuator includes an output shaft, and the one or more electrical components comprise a brake coupled to the output shaft and positioned within the second housing proximate the actuator. The actuator includes an output shaft, and the search and landing light includes a gearbox coupled between the output shaft and the canopy. The gearbox is a planetary gearbox and the output shaft is a sun gear. The search and landing light is coupled to the vehicle, and the vehicle includes a human-machine interface. The search and landing light includes a light controller, which is responsive to one or more control signals received from the human-machine interface to rotate the canopy relative to the housing.

Also provided is a vehicle. The vehicle includes a search and landing light coupled to a structure of the vehicle. The search and landing light includes a light emitting element having an output primarily along a first axis, and a canopy surrounding and coupled to the light emitting element. The search and landing light includes a housing to enclose one or more electrical components associated with the search and landing light. The housing and the canopy extend along a longitudinal axis that is substantially perpendicular to the first axis. The search and landing light includes a first actuator coupled proximate the housing that is configured to pivot the canopy relative to the housing to move the search and landing light relative to the vehicle between a first position and a second position. The search and landing light includes a second actuator coupled between the canopy and disposed in the housing. The second actuator is disposed along the longitudinal axis and is configured to rotate the canopy relative to the housing. The second actuator defines an axis of rotation, and the first actuator defines a second axis of rotation, and the axis of rotation is transverse to the second axis of rotation.

The housing comprises a first housing and a second housing. The first actuator is positioned proximate the first housing, the second actuator is disposed within the second housing, and the second housing is coupled between the first housing and the canopy to enclose the one or more electrical components. The second actuator includes an output shaft, and the one or more electrical components comprise a plurality of slip rings coupled to the output shaft and positioned within the second housing between the second actuator and the canopy. The vehicle includes a human-machine interface, and the search and landing light further comprises a light controller, which is responsive to one or more control signals received from the human-machine interface to rotate the canopy relative to the housing.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
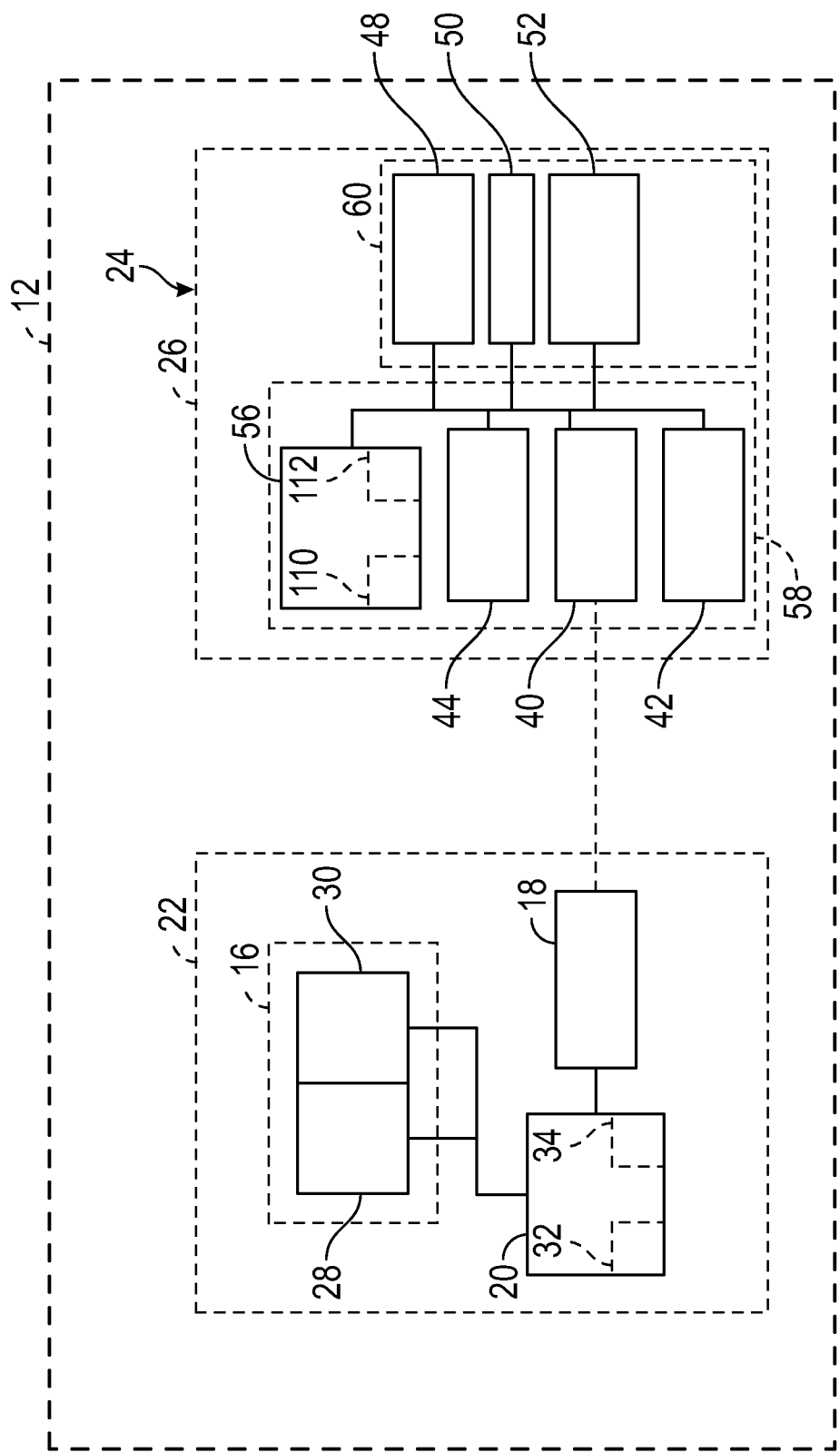
FIG. 1 is a functional block diagram illustrating a search and landing light system for a mobile platform, such as a rotorcraft, in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of light system, and the search and landing light for a mobile platform or vehicle is merely one exemplary embodiment according to the present disclosure. In addition, while the search and landing light is described herein as being employed with a mobile platform or vehicle, such as a bus, motorcycle, train, motor vehicle, marine vessel, aircraft, rotorcraft, unmanned aerial vehicle and the like, the various teachings of the present disclosure can be used with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the search and landing light system described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a functional block diagram of a search and landing light system 10 for a mobile platform, such as a rotorcraft 12, according to various embodiments. It should be noted that the rotorcraft 12 is merely one example of a mobile platform or vehicle, and as discussed, the search and landing light system 10 may be employed on various mobile platforms or vehicles, including aircraft, marine vessels, etc. In one example, the search and landing light system 10 includes a human-machine interface 16, a communication device 18 and a controller 20, which may be within a cabin 22 of the rotorcraft 12, for example, and at least one search and landing light or light 24 which may be coupled to a fuselage 26 the rotorcraft 12 and is generally remote from the human-machine interface 16. As will be discussed, the light 24 is in communication with the controller 20 via the communication device 18 to activate or deactivate the light 24; to move the light 24 from a first, retracted position to a second, extended position and positions therebetween; and to rotate the light 24 relative to the rotorcraft 12. It should be noted that while the human-machine interface 16, the communication device 18 and the controller 20 are described herein as being within the cabin 22 of the rotorcraft 12, such as a vehicle-based interface for the light 24, the human-machine interface 16, the communication device 18 and the controller 20 may be associated with a portable electronic device, including, but not limited to, an electronic flight bag, a tablet, smart phone, etc.

The human-machine interface 16 is in communication with the controller 20 via a suitable communication medium, such as a bus. The human-machine interface 16 may be configured in a variety of ways. In some embodiments, the human-machine interface 16 may include various switches, one or more buttons, a touchscreen interface 28 that may be overlaid on a display 30, a keyboard, a joystick, an audible device, a microphone associated with a speech recognition system, or various other human-machine interface devices. In one example, the touchscreen interface 28 may receive input from the user, such as a position for the light 24. The touchscreen interface 28 may include, but is not limited to, a resistive touchscreen panel, a capacitive touchscreen panel, a projected capacitance touchscreen panel, a surface capacitive touchscreen panel, a surface acoustic wave touchscreen panel, etc. Generally, upon the receipt input from the user, the human-machine interface 16 transmits a signal to the controller 20. As will be discussed, the controller 20 transmits the signal from the human-machine interface 16, via the communication device 18, to the light 24.

The display 30 comprises any suitable technology for displaying information, including, but not limited to, a liquid crystal display (LCD), organic light emitting diode (OLED), plasma, or a cathode ray tube (CRT). In this example, the display 30 is an electronic display capable of graphically displaying one or more user interfaces under the control of the controller 20. Those skilled in the art may realize other techniques to implement the display 30 in the search and landing light system 10.

The communication device 18 comprises any suitable system for receiving data from and transmitting data to the light 24. For example, the communication device 18 may achieve bi-directional communications with the light 24 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the communication device 18 includes, but is not limited to, a Bluetooth® transceiver and/or a Wi-Fi transceiver. Further, it should be noted that the communication device 18 is optional, as the light 24 may be in communication with the controller 20 over a suitable architecture associated with the rotorcraft 12 that enables the transfer of power, data, commands, including, but not limited to, a bus.

The controller 20 includes at least one processor 32 and a computer readable storage device or media 34. The processor 32 can be any custom made or commercially available processor, a central processing unit (CPU), a graphics processing unit (GPU), an auxiliary processor among several processors associated with the controller 20, a semiconductor based microprocessor (in the form of a microchip or chip set), a macroprocessor, any combination thereof, or generally any device for executing instructions. The computer readable storage device or media 34 may include volatile and nonvolatile storage in read-only memory (ROM), random-access memory (RAM), and keep-alive memory (KAM), for example. KAM is a persistent or non-volatile memory that may be used to store various operating variables while the processor 32 is powered down. The computer-readable storage device or media 34 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 20 in controlling components associated with the search and landing light system 10.

The instructions may include one or more separate programs, each of which comprises an ordered listing of executable instructions for implementing logical functions. The instructions, when executed by the processor 32, receive and process input signals, perform logic, calculations, methods and/or algorithms for controlling the components of the search and landing light system 10 of the rotorcraft 12, and generate signals to components of the search and landing light system 10 to control light output by the light 24 and a position of the light 24 based on the logic, calculations, methods, and/or algorithms. Although only one controller 20 is shown in FIG. 1, embodiments of the rotorcraft 12 can include any number of controllers 20 that communicate over any suitable communication medium or a combination of communication mediums and that cooperate to process the signals from the human-machine interface 16, process signals from the light 24, perform logic, calculations, methods, and/or algorithms, and generate control signals to control features of the light 24.

In various embodiments, one or more instructions of the controller 20 are associated with the search and landing light system 10 and, when executed by the processor 32, the instructions receive and process signals from the human-machine interface 16 to determine input received from a user to control the light 24. For example, the instructions of the controller 20, when executed by the processor 32, determine whether an input is received to activate the light 24, extend the light 24, retract the light 24, rotate the light 24 to the left (relative to the rotorcraft 12) or rotate the light 24 to the right (relative to the rotorcraft 12).

In one example, the light 24 includes a light communication device 40, a power source 42, a first actuator assembly 44, a second actuator assembly 48, a first position sensor 49, a second position sensor 50, at least one light emitting element 52, and a light controller 56. As will be discussed, in one example, the light communication device 40, the power source 42, the first actuator assembly 44, the first position sensor 49 and the light controller 56 are contained or disposed within a first housing 58, and the second actuator assembly 48, the second position sensor 50 and the light emitting element 52 is disposed in a second housing 60. It should be noted, in other embodiments, a single housing may contain all of the components of the light 24.

Figure 2:
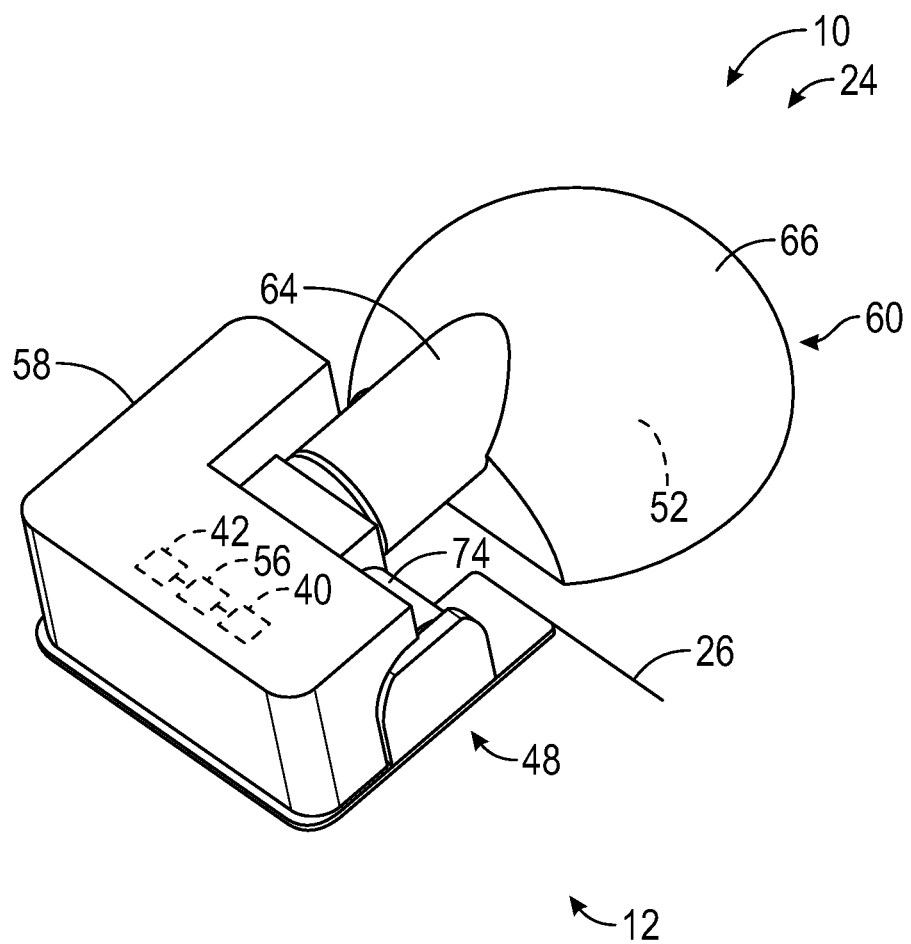
FIG. 2 is a top perspective view of a light of the search and landing light system of FIG. 1, in which the light is in a first, retracted position, in accordance with the various teachings of the present disclosure.

In one example, with reference to FIG. 2, the first housing 58 is fixedly coupled to the rotorcraft 12 via a mounting plate 62, while the second housing 60 is movable, via the first actuator assembly 44, relative to the fuselage 26 of the rotorcraft 12. In this example, the first housing 58 is substantially rectangular and the second housing 60 is substantially elongated, but the first housing 58 and the second housing 60 may have any desired shape. The second housing 60 includes a cylindrical portion 64 and a canopy 66. The cylindrical portion 64 surrounds the second actuator assembly 48, and the light emitting element 52 is surrounded by the canopy 66. The canopy 66 is generally hemispherical, and is configured to direct the light emitted by the light emitting element 52 outward, away from the second housing 60. The mounting plate 62 may be composed of metal, metal alloy or a polymer-based material, and serves to provide a mounting surface for the first housing 58 on the fuselage 26 of the rotorcraft 12. It should be noted that other mounting configurations are possible. The first housing 58 and the second housing 60 are each composed of a metal, metal alloy or polymer-based material, and may be formed through stamping, casting, machining, molding, additive manufacturing, etc.

With reference back to FIG. 1, the light communication device 40 comprises any suitable system for receiving data from and transmitting data to the communication device 18 associated with the controller 20. For example, the light communication device 40 may achieve bi-directional communications with the communication device 18 associated with the controller 20 over Bluetooth® or by utilizing a Wi-Fi standard, i.e., one or more of the 802.11 standards as defined by the Institute of Electrical and Electronics Engineers ("IEEE"), as is well known to those skilled in the art. Thus, the light communication device 40 includes, but is not limited to, a Bluetooth® transceiver and/or a Wi-Fi transceiver. Further, it should be noted that the light communication device 40 is optional, as the light controller 56 of the light 24 may be in communication with the controller 20 over a suitable architecture associated with the rotorcraft 12 that enables the transfer of power, data, commands, including, but not limited to, a bus.

The power source 42 includes a current source that supplies current to the light 24. In one example, the current source is a direct current source (DC), such as a DC-DC converter, for example, which is fed from a power supply associated with the rotorcraft 12. As will be discussed, the light controller 56 is in communication with the power source 42 to direct current to the light emitting element 52.

The light controller 56 is also in communication with the power source 42 to supply current to the first actuator assembly 44, the second actuator assembly 48, the first position sensor 49, the second position sensor 50 and the light communication device 40.

Figure 2A:
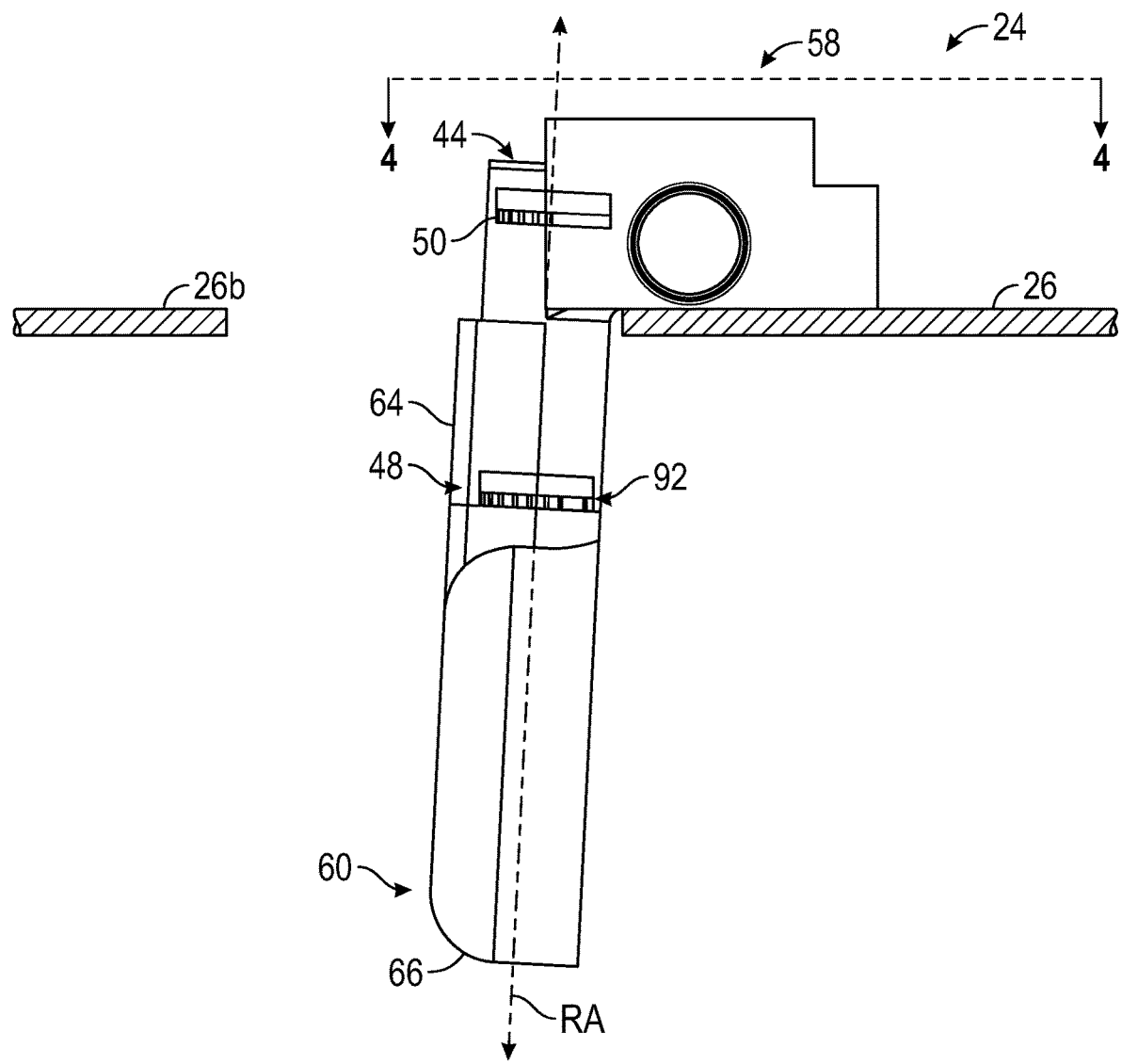
FIG. 2A is a side view of the light of the search and landing light system of FIG. 1, in which the light system is in a second, extended position, in accordance with the various teachings of the present disclosure.

The first actuator assembly 44 is in communication with the light controller 56 and is responsive to one or more control signals from the light controller 56 to move the second housing 60 relative to the fuselage 26 of the rotorcraft 12. With reference to FIG. 2, the light 24 is in a first, retracted position in which the second housing 60 is retracted within a surface 26a of the fuselage 26. In this position, the second housing 60 may be protected from an environment surrounding the rotorcraft 12. With reference to FIG. 2A, the light 24 is in a second, extended position in which the second housing 60 is positioned through an opening 26b defined in the fuselage 26 so as to extend below the surface 26a of the fuselage 26. It should be noted that the light emitting element 52 may illuminate a region around or under the rotorcraft 12 at any position of the light 24 including the first, retracted position, the second, extended position and any position therebetween.

Figure 3:
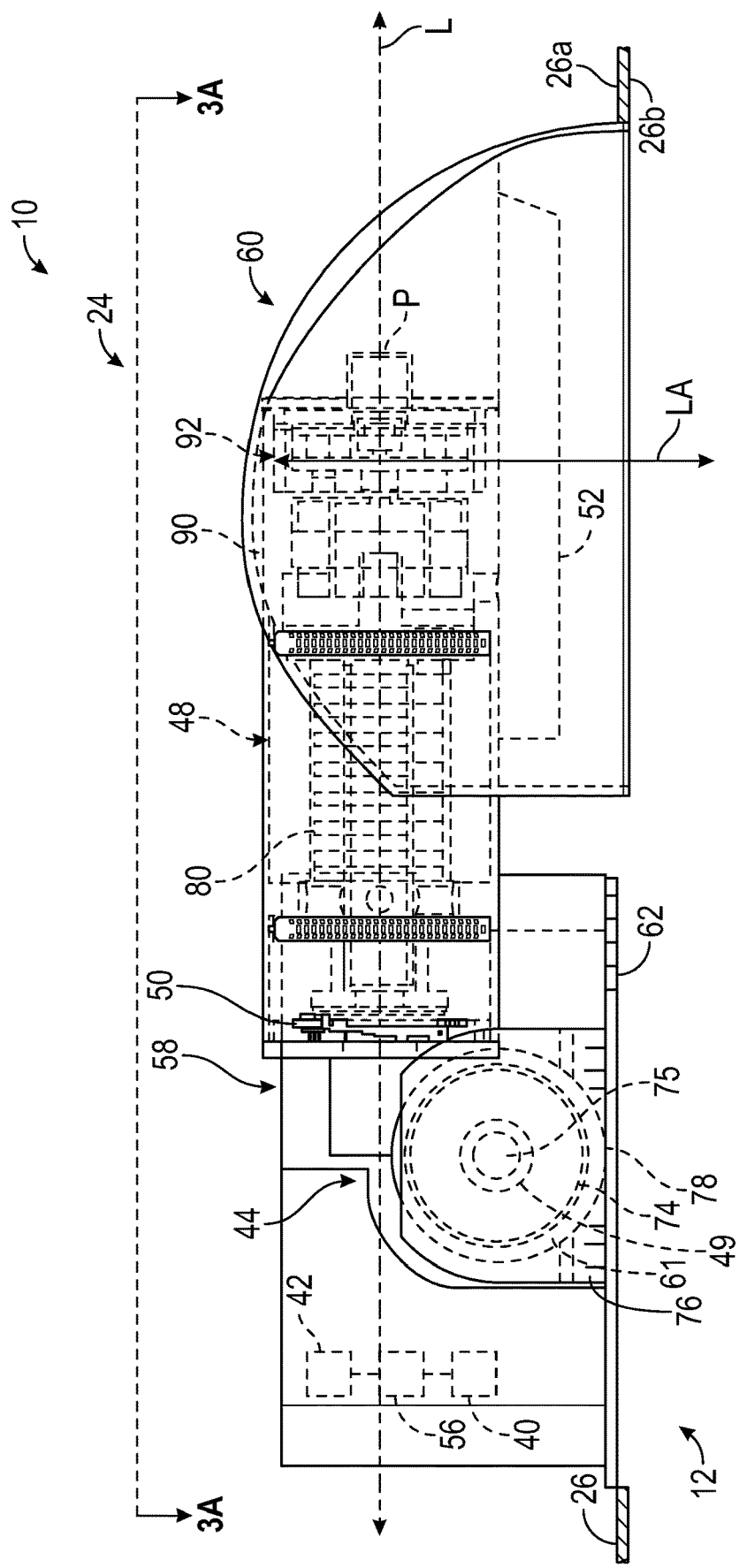
FIG. 3 is a side view of the light of the search and landing light system of FIG. 1, in which the light is in the first, retracted position, in accordance with the various teachings of the present disclosure.
Figure 3A:
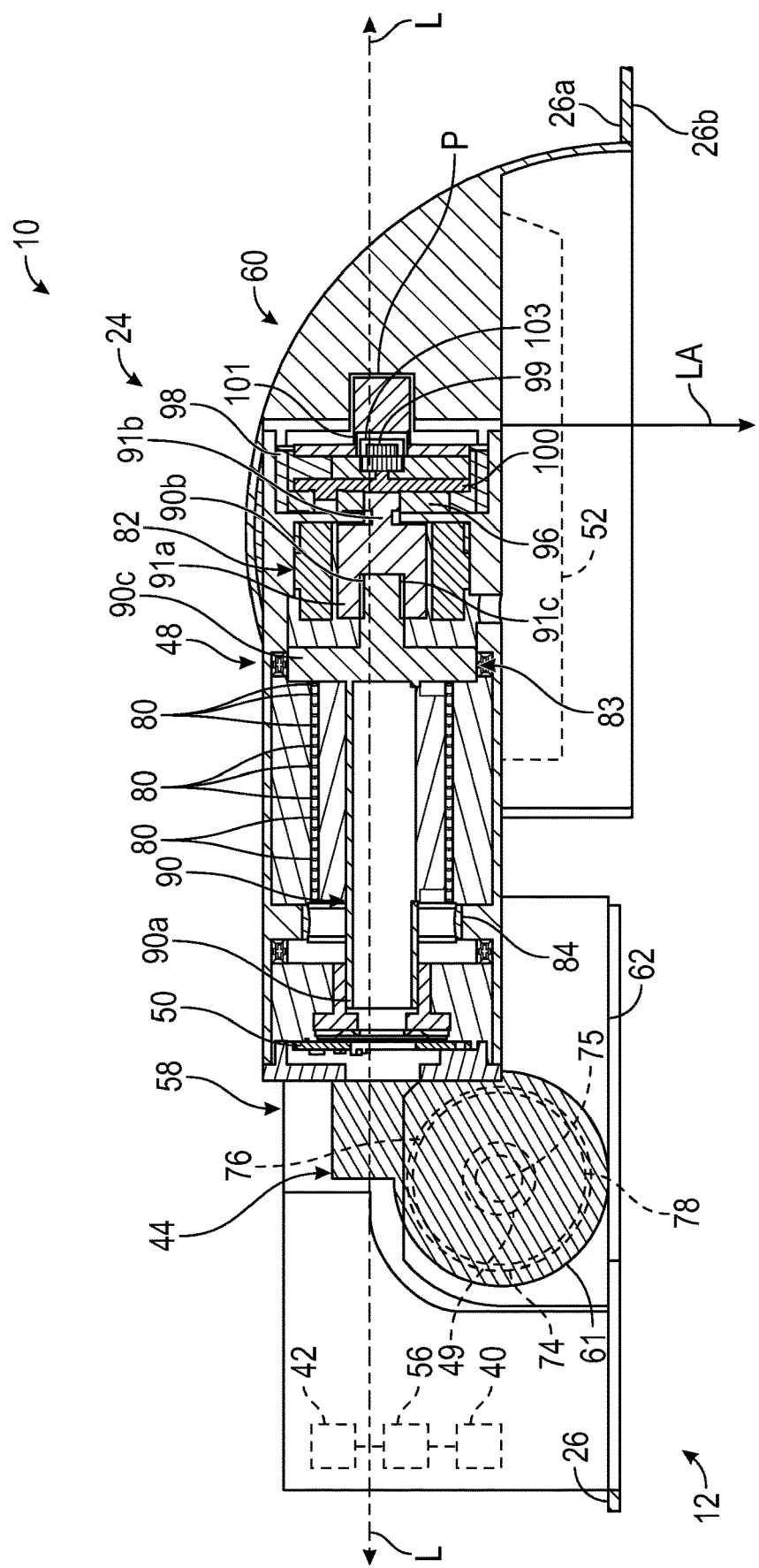
FIG. 3A is a cross-sectional view of the light of the search and landing light system of FIG. 1, taken along line 3A-3A of FIG. 3.
Figure 4:
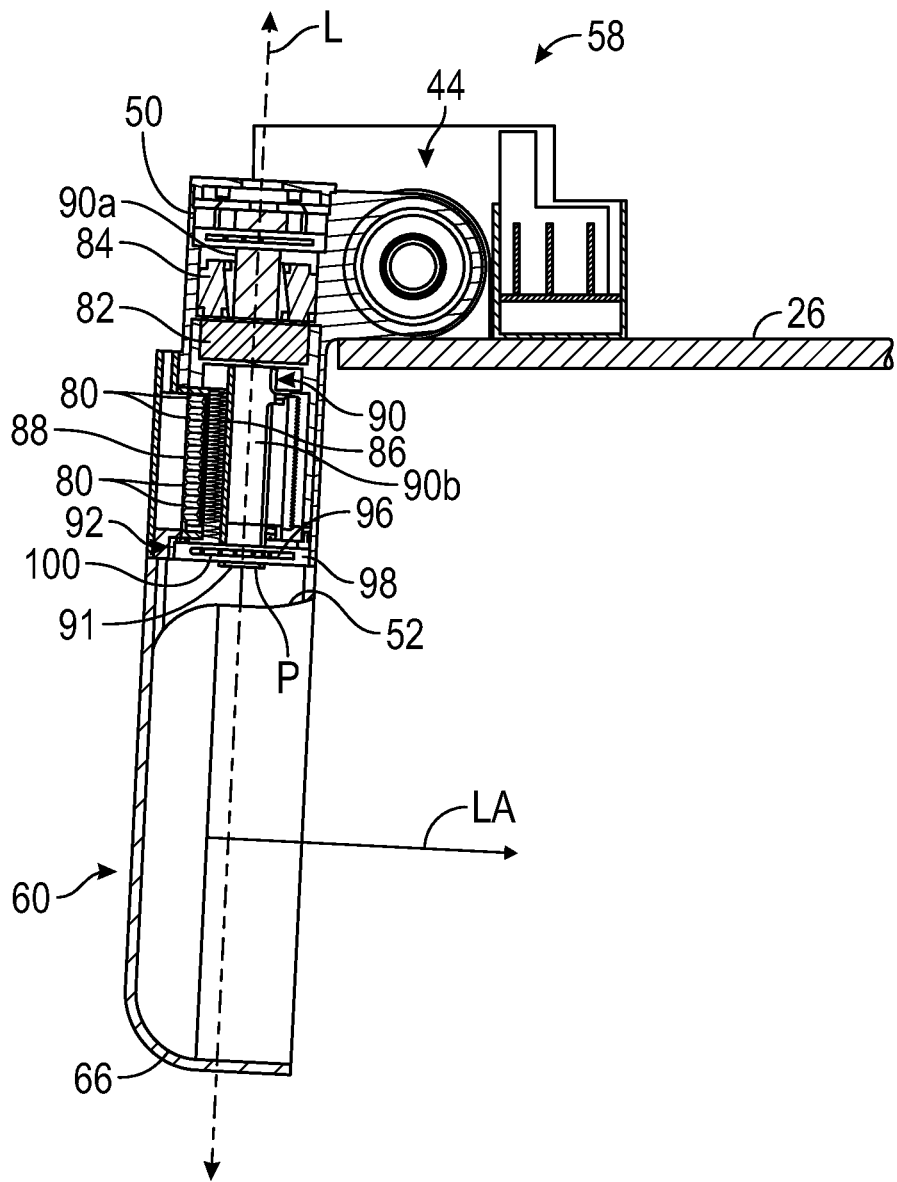
FIG. 4 is a cross-sectional view of the light of the search and landing light system of FIG. 1, taken along line 4-4 of FIG. 2A.

With reference to FIG. 3, the first actuator assembly 44 includes a first actuator 74 and a first brake 78. The first actuator 74 is in communication with the light controller 56 and the power source 42 to receive current from the power source 42. In this example, the first actuator 74 is a direct current (DC) motor. In one example, the first actuator 74 is coupled to the second housing 60, via a planetary gearbox 61 (FIG. 3A), for example, such that an application of a current to the first actuator 74 causes a rotation of the first actuator 74, which drives the planetary gearbox 61 and causes a corresponding rotation of the second housing 60. The first actuator 74 includes an output shaft 75, which is coupled to the planetary gearbox 61 (FIG. 3A). The planetary gearbox 61 includes at least one carrier and one or more planetary pinion gears that are driven by a sun gear, which in this example, is an end of the output shaft 75 (FIG. 3A). The output of the carrier of the planetary gearbox 61 is coupled to the second housing 60, via mating splined shafts, for example, and facilitates the rotation of the second housing 60 relative to the first housing 58 via the first actuator 74 (FIG. 3A). A bracket 76 may support the output shaft 75 for rotation. The bracket 76 may be composed of metal or metal alloy, and may be stamped, cast, forged, machined, etc. The bracket 76 is coupled to the mounting plate 62, via welding, mechanical fasteners, etc. The first housing 58 may include a cut-out or relief, which enables a portion of the first housing 58 to be positioned over a portion of the bracket 76 and the first actuator 74, which reduces a size of the light 24.

The first brake 78 is coupled to the output shaft 75 of the first actuator 74. The first brake 78 inhibits the further rotation of the output shaft 75 in an instance where the first actuator 74 is inadvertently uncoupled from the power source 42. The first brake 78 operates as a power-on and a power-off brake, which is magnetic, and prevents the rotation of the output shaft 75 during power-off, which may be intentional or unintentional.

The second actuator assembly 48 is in communication with the light controller 56 and is responsive to one or more control signals from the light controller 56 to rotate the canopy 66 relative to the second housing 60, and thus, the fuselage 26 of the rotorcraft 12. Generally, with reference to FIG. 2A, the canopy 66 is rotatable about an axis of rotation RA between a left position (the canopy 66 and the light emitting element 52 face into the page) to a right position (the canopy 66 and the light emitting element 52 face out of the page). Stated another way, the canopy 66 may be rotated from a position at 0 degrees (shown in FIG. 2A) to a position at positive 90 degrees (right position) and from the position at 0 degrees to a position at negative 90 degrees (left position). Thus, generally, the canopy 66 is movable between about negative 90 degrees and positive 90 degrees by the second actuator assembly 48; however, the canopy 66 may be movable about any desired range of motion, including, but not limited to 360 degrees. In this example, the canopy 66 is rotatable by the second actuator assembly 48 about a rotation point P (FIG. 3). The rotation of the canopy 66 by the second actuator assembly 48 follows a normal, expected circular pattern relative to the first housing 58 such that the light beam output by the light emitting element 52 follows a normal, circular pattern, which reduces operator workload as the light beam moves in the path expected by the operator. This movement of the light beam is due to the position of the second actuator assembly 48 within the second housing 60. By positioning the second actuator assembly 48 within the second housing 60, the light emitting element 52 is movable without requiring an additional pivot axis, which enables a movement of the light emitting element 52 in the expected, normal pattern and without requiring adjustment of the light 24 by the operator during a rotation of the light 24.

With reference to FIG. 3, the second actuator assembly 48 includes at least one or a plurality of slip rings 80, a second actuator 82 and a second brake 84. As discussed, the second actuator assembly 48 comprises one or more electrical components (the slip rings 80, the second actuator 82 and the second brake 84), which are contained wholly within the second housing 60. By positioning the second actuator assembly 48 within the second housing 60, the canopy 66 rotates relative to the first housing 58 in an expected manner, and moreover, a larger number of the slip rings 80 may be utilized with the second actuator assembly 48. In one example, the second actuator assembly 48 includes about 3 to about 30 slip rings 80, which enables increased power and signal transfer between the light controller 56 and the light emitting element 52. In addition, the increase in the number of slip rings 80 and the positioning of the slip rings 80 within the second housing 60 also enables other devices, such as sensors, cameras, etc., to be coupled to the second housing 60 without increasing a packaging size associated with the light 24. As each of the slip rings 80 are generally known, the slip rings 80 will not be discussed in detail herein. Generally, the slip rings 80 comprise any suitable slip ring that is received within the second housing 60 and operates to transfer power and signals between the light controller 56 and the light emitting element 52. In this example, each of the slip rings 80 include a metal ring 86, which contacts an inner diameter of a stationary brush 88. Each of the rings 86 is coupled to a slip ring shaft portion 90 of the second actuator 82 such that a rotation of the slip ring shaft portion 90 rotates each of the rings 86 relative to the stationary brush 88. As the rings 86 rotate, power and/or signals are conducted through the stationary brush 88.

The second actuator 82 is in communication with the light controller 56 and the power source 42 to receive current from the power source 42. In this example, the second actuator 82 is a direct current (DC) motor. In one example, the second actuator 82 is fixedly coupled to the second housing 60, via welding, for example. The second actuator 82 has an output shaft 83, which includes the slip ring shaft portion 90 and a driving shaft portion 91. It should be noted that while the output shaft 83 is described herein as comprising two shaft portions 90, 91 for ease of description, the output shaft 83, in this example, is a single shaft. The second actuator 82 drives or rotates the driving shaft portion 91, which drives or rotates the slip ring shaft portion 90. In this example, the slip ring shaft portion 90 extends axially from the second actuator 82 towards the first housing 58. In this regard, a first end 90a of the slip ring shaft portion 90 is coupled to the driving shaft portion 91 proximate the canopy 66, and an opposite second end 90b is proximate the first housing 58. The first end 90a has a diameter, which is different, and in this example, greater than a diameter of the second end 90b. The slip rings 80 are coupled about the slip ring shaft portion 90 between the first end 90a and the second end 90b. The slip ring shaft portion 90 may also include a flange 90c, which assists in maintaining a position of the slip rings 80 about the slip ring shaft portion 90. The flange 90c is annular, and has a diameter, which is greater than the diameter of the first end 90a of the slip ring shaft portion 90. The second brake 84 is coupled to the slip ring shaft portion 90 between the slip rings 80 and the first end 90a of the slip ring shaft portion 90. Thus, in this example, the second brake 84 and the flange 90c assist in maintaining a position of the slip rings 80 within the second housing 60. The second end 90b of the slip ring shaft portion 90 is fixedly coupled to the driving shaft portion 91 for rotation with the driving shaft portion 91.

The driving shaft portion 91 is driven by the second actuator 82. The driving shaft portion 91 includes a first end 91a and an opposite second end 91b. The first end 91a includes a bore 91c that receives the second end 90b of the slip ring shaft portion 90, and couples the slip ring shaft portion 90 to the driving shaft portion 91 such that the slip ring shaft portion 90 rotates with the driving shaft portion 91. The second end 91b of the driving shaft portion 91 is coupled to a gearbox 92. In one example, the gearbox 92 is a planetary gearbox, which includes one or more planetary pinion gears 96 and a ring gear 98. The second end 91b is a sun gear for the gearbox 92, and matingly engages with the planetary pinion gears 96 to drive the planetary pinion gears 96 with the ring gear 98. The planetary pinion gears 96 matingly engage with both the second end 91b and the ring gear 98. The planetary pinion gears 96 are coupled to one or more planetary carriers 100. In this example, the second end 91b is coupled to the canopy 66 such that the second end 91b directly drives or rotates the canopy 66. In one example, the second end 91b includes a plurality of splines 99 defined about a perimeter or circumference of the second end 91b. The plurality of splines 99 meshingly engage with a plurality of splines 101 defined within a recessed portion 103 of the canopy 66. The engagement between the plurality of splines 99 of the second end 91b and the plurality of splines 101 of the canopy 66 enables the driving shaft portion 91 to directly drive the movement or rotation of the canopy 66. Thus, the rotation of the output shaft 83 results in a rotation of the canopy 66 and the light emitting element 52 contained within the canopy 66 relative to the first housing 58. The gearbox 92 reduces a speed of the output shaft 83, which provides for a smooth movement of the canopy 66.

The second brake 84 is coupled to the first end 90a of the slip ring shaft portion 90 of the output shaft 83 of the second actuator 82. The second brake 84 inhibits the further rotation of the output shaft 83 in an instance where the second actuator 82 is inadvertently uncoupled from the power source 42. The second brake 84 is magnetic and operates as a power-off brake that will prevent the rotation of the output shaft 75 during power-off, which may be intentional or unintentional. Once the second actuator 82 overcomes the brake force of the second brake 84, an inertia of a rotor of the second actuator 82 may receive a little drag from the second brake 84. When power is removed from the second actuator 82, the second brake 84 acts to hold the canopy 66 in a fixed position.

The first position sensor 49 observes a rotation of the output shaft 75, and generates sensor signals based thereon. In one example, the first position sensor 49 is coupled to an end of the output shaft 75, and observes a rotation of the output shaft 75. The first position sensor 49 is in communication with the light controller 56 over a communication architecture that facilitates the transfer of data, power, commands, control signals, etc. Generally, the first position sensor 49 is an encoder, which generates sensor signals based on the observed position of the output shaft 75. In one example, the first position sensor 49 is an absolute rotary encoder, which observes an angular position or motion of the output shaft 75 and generates sensor signals based thereon. As the first position sensor 49 is coupled or mounted directly on the output shaft 75, and the output shaft 75 drives the rotation of the second housing 60, the light controller 56, based on the sensor signals received from the first position sensor 49, determines the position of the second housing 60. Based on the determined position of the second housing 60, the light controller 56 may output one or more control signals to the first actuator 74 to inhibit a further rotation of the second housing 60, for example, when the second housing 60 has reached the position received as input by the human-machine interface 16 (FIG. 1).

The second position sensor 50 observes a rotation of the output shaft 83, and generates sensor signals based thereon. In one example, the second position sensor 50 is coupled to the first end 90a of the slip ring shaft portion 90, and observes a rotation of the output shaft 83. The second position sensor 50 is in communication with the light controller 56 over a communication architecture that facilitates the transfer of data, power, commands, control signals, etc. Generally, the second position sensor 50 is an encoder, which generates sensor signals based on the observed position of the slip ring shaft portion 90. In one example, the second position sensor 50 is an absolute rotary encoder, which observes an angular position or motion of the slip ring shaft portion 90 and generates sensor signals based thereon. As the second position sensor 50 is coupled or mounted directly on the slip ring shaft portion 90 of the output shaft 83, and the output shaft 83 drives the rotation of the canopy 66 via the driving shaft portion 91, the light controller 56, based on the sensor signals received from the second position sensor 50, determines the position of the canopy 66. Based on the determined position of the canopy 66, the light controller 56 may output one or more control signals to the second actuator 82 to inhibit a further rotation of the canopy 66, for example, when the canopy 66 has reached the position received as input by the human-machine interface 16 (FIG. 1).

The at least one light emitting element 52 is coupled to the canopy 66. The light emitting element 52 includes, but is not limited to, a light emitting diode (LED), halogen light bulb, organic light-emitting diode (OLED), laser diode, etc. The light emitting element 52 is electrically coupled, via the slip rings 80, to the light controller 56 to receive power to illuminate. The light emitting element 52 is responsive to one or more control signals from the light controller 56 to illuminate and output a light beam along an axis LA as shown in FIG. 3. The light beam emitted by the light emitting element 52 extends along the axis LA, which is transverse to or substantially perpendicular to a longitudinal axis L that extends through the second housing 60. Generally, the axis LA is perpendicular to the longitudinal axis L within about a few degrees due to manufacturing tolerances. Although a single light emitting element 52 is shown, the light emitting element 52 may comprise any number of light emitting elements, which may be arranged in any predefined manner within the canopy 66. In addition, although not shown, a lens, transparent cover or the like may be employed to enclose the light emitting element 52 within the canopy 66 and protect the light emitting element 52 from the environment. Generally, the light beam emitted by the light emitting element 52 is directed primarily along the axis LA or at least about 75% to about 100% of the light beam emitted by the light emitting element 52 is directed along the axis LA.

With reference to FIG. 1, the light controller 56 includes at least one processor 110 and a computer readable storage device or media 112. The processor 110 can be any custom made or commercially available processor, a central processing unit (CPU), a graphics processing unit (GPU), an auxiliary processor among several processors associated with the light controller 56, a semiconductor based microprocessor (in the form of a microchip or chip set), a macroprocessor, any combination thereof, or generally any device for executing instructions. The computer readable storage device or media 112 may include volatile and nonvolatile storage in read-only memory (ROM), random-access memory (RAM), and keep-alive memory (KAM), for example. KAM is a persistent or non-volatile memory that may be used to store various operating variables while the processor 110 is powered down. The computer-readable storage device or media 112 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the light controller 56 in controlling components associated with the light 24.

The instructions may include one or more separate programs, each of which comprises an ordered listing of executable instructions for implementing logical functions. The instructions, when executed by the processor 110, receive and process input signals, perform logic, calculations, methods and/or algorithms for controlling the components of the light 24, and generate control signals to components of the light 24 to control a position of the light and to illuminate the light emitting element 52 based on the logic, calculations, methods, and/or algorithms. Although only one light controller 56 is shown in FIG. 1, embodiments of the light 24 can include any number of controllers 56 that communicate over any suitable communication medium or a combination of communication mediums and that cooperate to process the signals from the first position sensor 49, process the signals from the second position sensor 50, process signals from the controller 20, perform logic, calculations, methods, and/or algorithms, and generate control signals to control the light emitting element 52, the first actuator 74 and the second actuator 82 of the light 24.

In various embodiments, one or more instructions of the light controller 56 are associated with the light 24 and, when executed by the processor 110, the instructions receive and process signals from the controller 20 to determine to illuminate the light emitting element 52 and the light controller 56 outputs one or more control signals to the light emitting element 52 based on this determination. In various embodiments, one or more instructions of the light controller 56 are associated with the light 24 and, when executed by the processor 110, the instructions receive and process signals from the controller 20 to determine to move the second housing 60 from the first, retracted position (FIG. 3) to the second, extended position (FIG. 2A) with the first actuator 74 and the light controller 56 outputs one or more control signals to the first actuator 74 based on this determination. In various embodiments, one or more instructions of the light controller 56 are associated with the light 24 and, when executed by the processor 110, the instructions receive and process signals from the controller 20 to determine to move the canopy 66 about the axis of rotation RA and the light controller 56 outputs one or more control signals to the second actuator 82 based on this determination. In various embodiments, one or more instructions of the light controller 56 are associated with the light 24 and, when executed by the processor 110, the instructions receive and process signals from the first position sensor 49 to determine whether the position of the second housing 60 relative to the first housing 58 corresponds with the input position and the light controller 56 outputs one or more control signals to the first actuator 74 based on this determination. In various embodiments, one or more instructions of the light controller 56 are associated with the light 24 and, when executed by the processor 110, the instructions receive and process signals from the second position sensor 50 to determine whether the position of the canopy 66 relative to the first housing 58 corresponds with the input position and the light controller 56 outputs one or more control signals to the second actuator 82 based on this determination.

In one example, in order to assemble the light 24, with reference to FIG. 3, with the bracket 76 coupled to the mounting plate 62, the output shaft 75 of the first actuator 74 is coupled to the bracket 76 and to the planetary gearbox 61. The first position sensor 49 is coupled to the output shaft 75. The planetary gearbox 61 is coupled to the second housing 60. The light communication device 40 and the power source 42 are each coupled to the light controller 56 to be in communication with the light controller 56. The slip rings 80 are coupled to the slip ring shaft portion 90 of the output shaft 83 of the second actuator 82, and the slip ring shaft portion 90 is coupled to the second position sensor 50 and the second brake 84. The gearbox 92 is coupled to the driving shaft portion 91 of the output shaft 83. With the light emitting element 52 coupled to the canopy 66, the canopy 66 is coupled to the gearbox 92. The light emitting element 52 is coupled to the slip rings 80 to enable communication between the light controller 56 and the light emitting element 52. The cylindrical portion 64 is positioned about the output shaft 83 to enclose the output shaft 83, the slip rings 80, the second brake 84 and the second position sensor 50. With the first position sensor 49, the second position sensor 50, the slip rings 80 and the light emitting element 52 coupled to and in communication with the light controller 56, the light controller 56 is coupled to and placed in communication with the controller 20. The first housing 58 is positioned over and coupled to the mounting plate 62. With the light 24 assembled, the light 24 is coupled to the fuselage 26 via one or more mechanical fasteners, for example.

Figure 5:
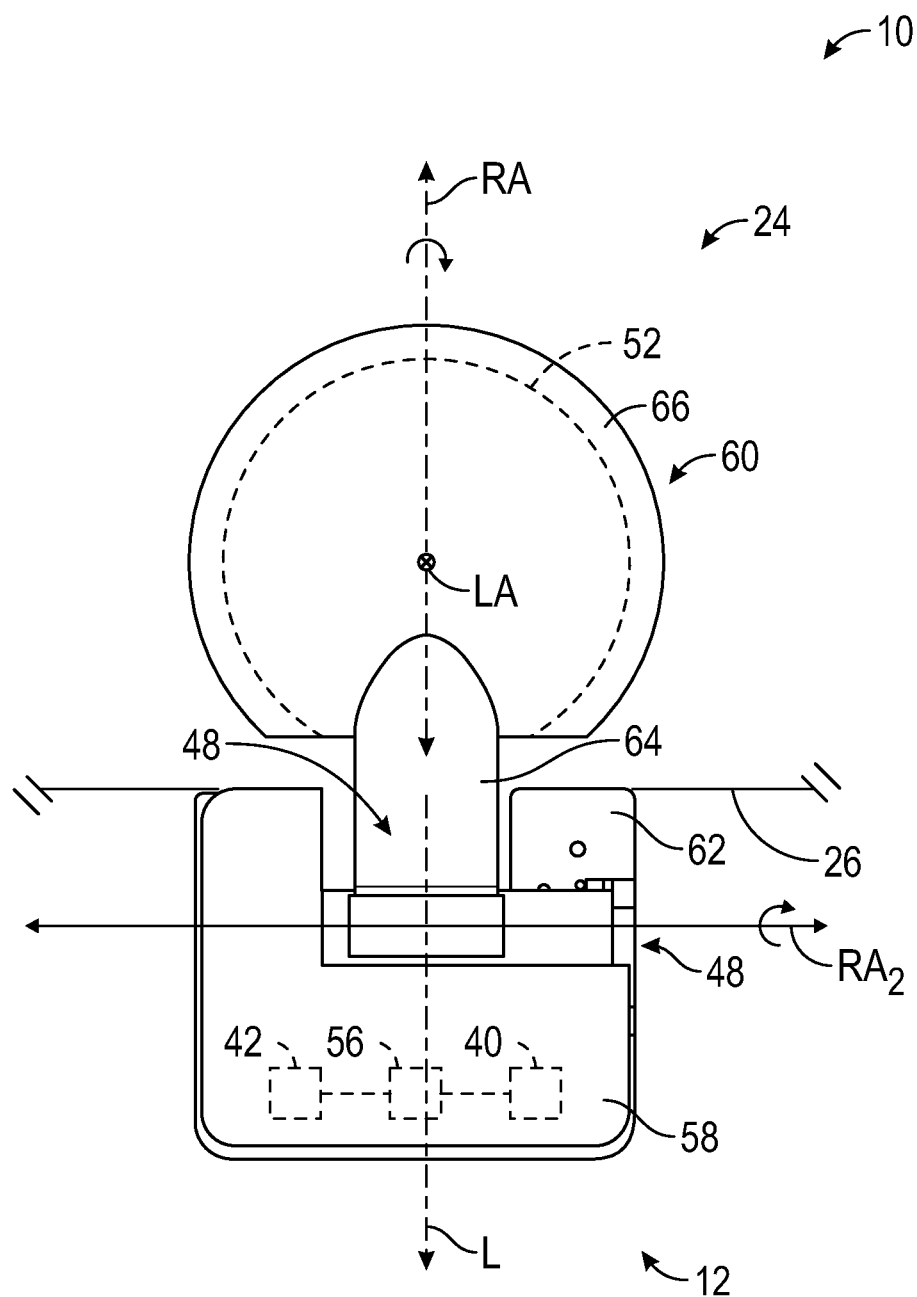
FIG. 5 is a top view of the light of the search and landing light system of FIG. 1, in accordance with the various teachings of the present disclosure.

With the light 24 coupled to the fuselage 26, the light 24 is movable relative to the fuselage 26 between the first, retracted position, the second, extended position and positions therebetween by the first actuator 74. In one example, based on input received from the input device 116, the controller 20 outputs one or more control signals to the light controller 56 for the light controller 56 to command the first actuator 74 to move the second housing 60 about a second axis of rotation RA2 (FIG. 5). Based on the receipt of the one or more control signals from the controller 20, the light controller 56 outputs one or more control signals to the first actuator 74 to move the second housing 60, and thus, the light 24 to the second, extended position (FIG. 2A). Based on input received from the input device 116, the controller 20 outputs one or more control signals to the light controller 56 for the light controller 56 to illuminate the light emitting element 52. Based on the receipt of the one or more control signals from the controller 20, the light controller 56 outputs one or more control signals to the light emitting element 52 to illuminate. Based on input received from the input device 116, the controller 20 outputs one or more control signals to the light controller 56 for the light controller 56 to rotate the canopy 66, and thus, the light emitting element 52, relative to the second housing 60 along the axis of rotation RA (FIG. 5). Based on the receipt of the one or more control signals from the controller 20, the light controller 56 outputs one or more control signals to the second actuator 82 to rotate the canopy 66, and thus, the light beam output by the light emitting element 52 relative to the second housing 60 and the rotorcraft 12.

As shown in FIG. 5, the axis of rotation RA is different than, and in this example, transverse or substantially perpendicular to the second axis of rotation RA2. In addition, as shown in FIG. 3, the second actuator assembly 48 containing one or more electrical components associated with the light 24 is contained within the second housing 60 along the longitudinal axis L, which is substantially perpendicular to the axis LA of the light beam emitted by the light emitting element 52. As discussed, the position of the second actuator assembly 48 within the second housing 60 enables a normal, circular pattern of rotation of the canopy 66 relative to the second housing 60, which ensures that the light beam output by the light emitting element 52 follows a normal, expected circular pattern. The output of the light beam by the light emitting element 52 along the axis LA in the expected circular pattern reduces operator workload as the light beam moves in the path expected by the operator. Moreover, the positioning the second actuator assembly 48 within the second housing 60 and along the longitudinal axis L reduces a size of the light 24, while improving signal and/or power transmission capabilities through the additional slip rings 80 that are positionable within the second housing 60. In addition, the positioning of the second actuator assembly 48 within the second housing 60 provides space for additional components to be packaged with the light 24, including, but not limited to, sensors, cameras, etc., without increasing a packaging space required for the light 24. Further, by integrating the slip rings 80 within the second housing 60, a weight of the light 24 is reduced.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A search and landing light for a vehicle, comprising:
   a light emitting element having an output primarily along a first axis;
   a canopy surrounding the light emitting element;
   a housing to enclose one or more electrical components associated with the search and landing light, the housing and the canopy extending along a longitudinal axis that is substantially perpendicular to the first axis, the housing including a first housing and a second housing;
   a first actuator coupled between the canopy and the housing, the first actuator including a first output shaft that defines a second axis of rotation that is transverse to the longitudinal axis and the first actuator is configured to pivot the canopy relative to the housing; and
   a second actuator coupled to the canopy and disposed in the second housing, the second actuator disposed along the longitudinal axis and configured to rotate the canopy relative to the housing,
   wherein the first actuator is positioned proximate to the first housing, and the second housing is coupled between the first housing and the canopy along the longitudinal axis to enclose the one or more electrical components.

2. The search and landing light of claim 1, wherein the second actuator includes an output shaft, which defines a first axis of rotation, and the first axis of rotation is transverse to the second axis of rotation defined by the first actuator.

3. The search and landing light of claim 1, wherein the second actuator includes an output shaft, and the one or more electrical components comprise at least one slip ring coupled to the output shaft and positioned within the second housing between the second actuator and the canopy.

4. The search and landing light of claim 1, wherein the second actuator includes an output shaft, and the one or more electrical components comprise a brake coupled to the output shaft and positioned within the second housing proximate the second actuator.

5. The search and landing light of claim 1, wherein the second actuator includes an output shaft, and the search and landing light further comprises a gearbox coupled between the output shaft and the canopy.

6. The search and landing light of claim 5, wherein the gearbox is a planetary gearbox and the output shaft is a sun gear.

7. The search and landing light of claim 1, further comprising a light controller, which is responsive to one or more control signals received from a human-machine interface to rotate the canopy relative to the housing.

8. A search and landing light for a vehicle, comprising:
   a light emitting element having an output primarily along a first axis;
   a canopy surrounding and coupled to the light emitting element;
   a housing to enclose one or more electrical components associated with the search and landing light, the housing and the canopy extending along a longitudinal axis that is substantially perpendicular to the first axis, the housing including a first housing and a second housing;
   a first actuator coupled proximate the first housing that is configured to pivot the canopy relative to the housing; and
   a second actuator coupled to the canopy and disposed within the second housing, the second actuator disposed along the longitudinal axis and configured to rotate the canopy relative to the housing,
   wherein the second actuator defines a first axis of rotation, the first actuator defines a second axis of rotation, the first axis of rotation is transverse to the second axis of rotation, and the second housing is coupled between the first housing and the canopy to enclose the one or more electrical components.

9. The search and landing light of claim 8, wherein the second actuator includes an output shaft, and the one or more electrical components comprise at least one slip ring coupled to the output shaft and positioned within the second housing between the second actuator and the canopy.

10. The search and landing light of claim 8, wherein the second actuator includes an output shaft, and the one or more electrical components comprise a brake coupled to the output shaft and positioned within the second housing proximate the second actuator.

11. The search and landing light of claim 8, wherein the second actuator includes an output shaft, and the search and landing light further comprises a gearbox coupled between the output shaft and the canopy.

12. The search and landing light of claim 11, wherein the gearbox is a planetary gearbox and the output shaft is a sun gear.

13. The search and landing light of claim 8, wherein the search and landing light is coupled to the vehicle, the vehicle includes a human-machine interface, and the search and landing light further comprises a light controller, which is responsive to one or more control signals received from the human-machine interface to rotate the canopy relative to the housing.

14. A vehicle, comprising:
   a search and landing light coupled to a structure of the vehicle, the search and landing light including:
      a light emitting element having an output primarily along a first axis;
      a canopy surrounding and coupled to the light emitting element;
      a housing to enclose one or more electrical components associated with the search and landing light, the housing and the canopy extending along a longitudinal axis that is substantially perpendicular to the first axis, and the housing includes a first housing and a second housing;
      a first actuator coupled proximate the first housing that is configured to pivot the canopy relative to the housing to move the search and landing light relative to the vehicle between a first position and a second position; and
      a second actuator coupled to the canopy and disposed in the second housing, the second actuator disposed along the longitudinal axis and configured to rotate the canopy relative to the housing, wherein the second actuator defines a first axis of rotation, the first actuator defines a second axis of rotation, the first axis of rotation is transverse to the second axis of rotation, and the second housing is coupled between the first housing and the canopy to enclose the one or more electrical components.

15. The vehicle of claim 14, wherein the second actuator includes an output shaft, and the one or more electrical components comprise a plurality of slip rings coupled to the output shaft and positioned within the second housing between the second actuator and the canopy.

16. The vehicle of claim 14, wherein the vehicle includes a human-machine interface, and the search and landing light further comprises a light controller, which is responsive to one or more control signals received from the human-machine interface to rotate the canopy relative to the housing.

\* \* \* \* \*